United States Patent [19]
Deutch et al.

[11] Patent Number: 5,039,122
[45] Date of Patent: Aug. 13, 1991

[54] BICYCLE AUXILIARY POWER UNIT

[76] Inventors: Arthur Deutch, 6510 Kendale Lakes Dr., Apartment 604, Miami, Fla. 33183; Humberto Miralles, 9415 SW. 39 St., Miami, Fla. 33165

[21] Appl. No.: 547,175

[22] Filed: Jul. 3, 1990

[51] Int. Cl.⁵ .................... B62M 1/00; B62M 1/14
[52] U.S. Cl. .................... 280/234; 280/246; 280/255
[58] Field of Search ............... 280/230, 233, 234, 241, 280/245, 246, 251, 255, 258; 272/73

[56] References Cited
U.S. PATENT DOCUMENTS 2,547,600  4/1951  Saxer ................................. 280/245
2,732,221  1/1956  Welch ................................ 280/246

FOREIGN PATENT DOCUMENTS 2913912  10/1980  Fed. Rep. of Germany ...... 280/241
211589  12/1940  Switzerland ........................ 280/233

Primary Examiner—Charles A. Marmor
Assistant Examiner—Kevin Hurley
Attorney, Agent, or Firm—Sherman Levy

[57] ABSTRACT

A bicycle auxiliary power unit is provided wherein hand powered levers provide a mechanical means for transposing the natural power strokes of the rider to the mechanism propelling the vehicle. The auxiliary power unit provides a means for permitting a street bicycle to be utilized for exercising the upper and lower extremities.

1 Claim, 3 Drawing Sheets

BICYCLE AUXILIARY POWER UNIT

BACKGROUND OF THE INVENTION

The present invention generally relates to a bicycle, and more particularly to an auxiliary power unit for a bicycle.

DESCRIPTION OF THE PRIOR ART

Various types of bicycles and power units have been provided as for example as shown in prior U.S. Pat. Nos. to Gatling, 519,384; Harmon, 643,647; Clark, 3,913,945; Lindsey, Jr., 4,147,370; Patroni, Jr., 4,548,420; Wilhelm, 4,733,880; and Phillips, 4,773,662. However, neither these prior patents nor any others known to Applicant achieve the results accomplished by the present invention. For example, Gatling in U.S. Pat. No. 519,384; Clark in U.S. Pat. No. 3,913,945; Wilhelm in U.S. Pat. No. 4,733,880; and Harmon in U.S. Pat. No. 643,647 do not have a front wheel drive. Patroni has a rotary crank, Lindsey, Jr., has a reciprocating connecting rod/rotary crank. Phillips uses a conventional foot pedal rotary crank for his front wheel drive gear, only changing the pedals to handgrips. The Phillips' unit protrudes and extends well above the actual handlebar location making his bike top heavy and blocking the rider's frontal view.

SUMMARY OF THE PRESENT INVENTION

A primary object of the present invention is to provide a bicycle auxiliary power unit wherein hand powered levers provide a new unique mechanical method of transposing the power strokes of the rider to the mechanism propelling the vehicle.

Another object of the present invention is to provide a bicycle auxiliary power unit that exercises the upper and lower extremities.

A still further object of the present invention is to provide a bicycle auxiliary power unit which is inexpensive to manufacture and efficient to use.

These and other objects and advantages of the present invention will become apparent with reference to the drawings, the description of the preferred embodiment and the appended claims.

DESCRIPTION OF THE PREFERRED EMBODIMENT

Figure 1:
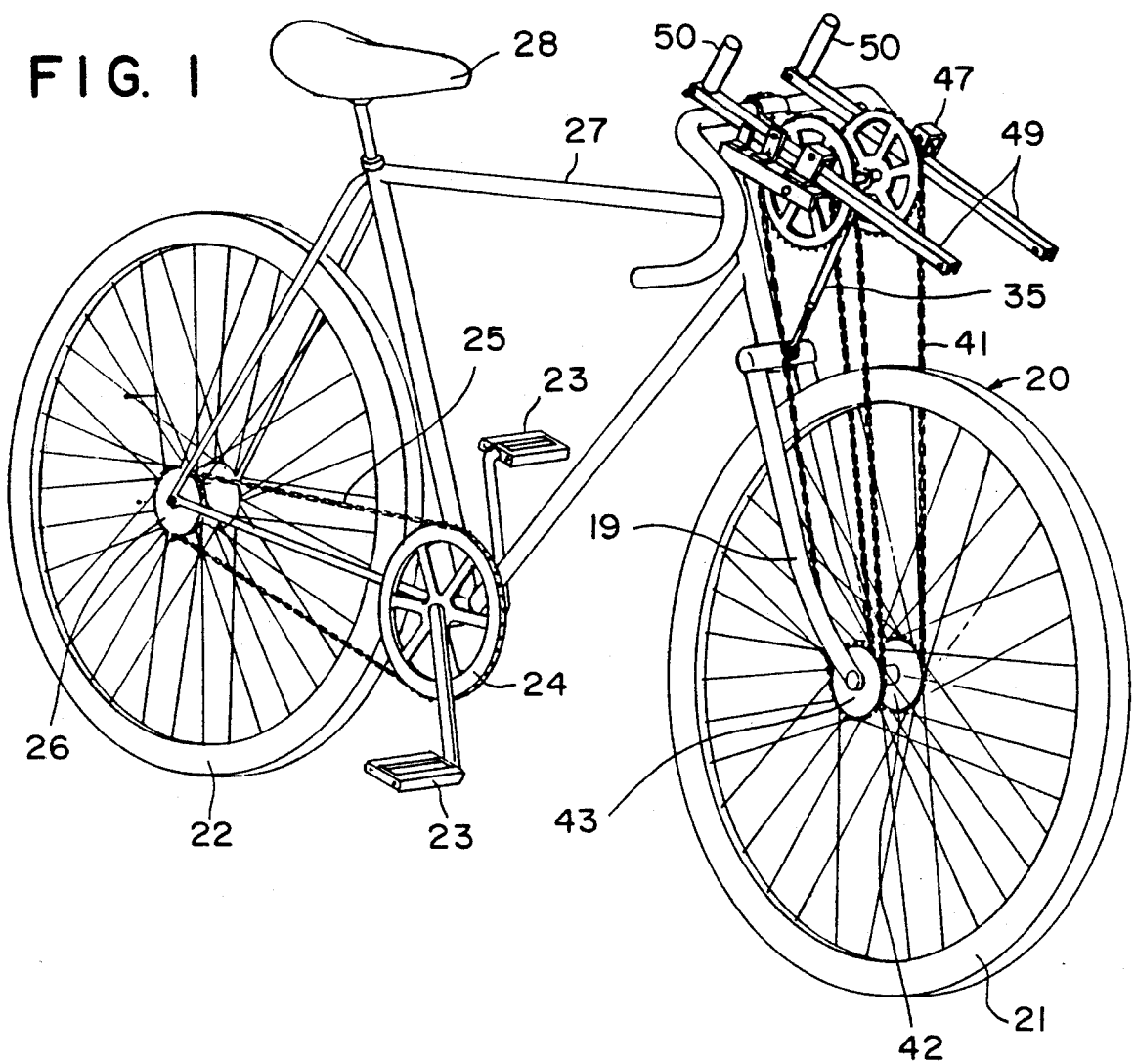
FIG. 1 is a perspective view illustrating the bicycle auxiliary power unit of the present invention.

Referring in detail to the drawings, the numeral 20 indicates a bicycle that includes the usual front wheel 21, rear wheel 22, foot pedals 23, sprocket 24, chain 25, and rear wheel sprocket 26. The bicycle 20 further includes a frame 27, seat 28, and handlebars 29.

As shown in the drawings, the handlebars 29 include end portions 30, sections 31, and an intermediate portion 32.

Figure 4:
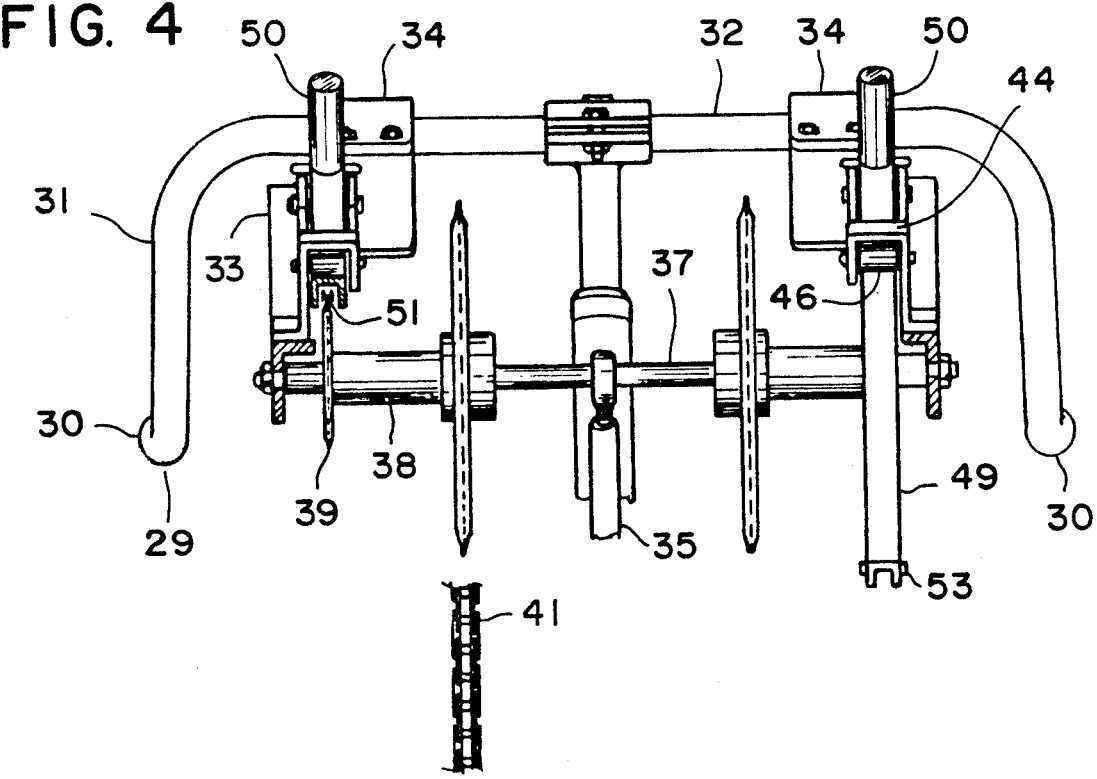
FIG. 4 is a sectional view taken on the line 4—4 of FIG. 3.

The numeral 33 indicates the brackets that are affixed to support members 34 that are mounted on the intermediate portion 32 of the handlebars, FIG. 4. Brace assemblies 35 provide a support for an axle or shaft 37, and the brace assemblies 35 are adjustable. The lower ends of the brace assemblies 35 are secured to the front fork 19 of the bicycle by means of a suitable securing assembly 36. A sleeve 38 is mounted on the axle 37, and cogs 39 and 40 are secured to the sleeve 38.

Endless chains 41 are arranged in engagement with the upper cog 40 and the chains 41 also engage lower cogs 42 that are connected to the axle 43 of the front wheel 21.

Figure 2:
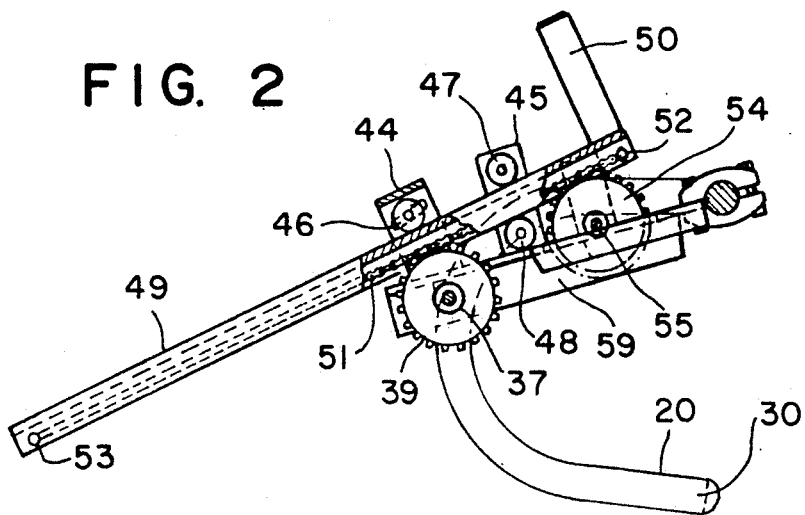
FIG. 2 is a sectional view taken on the line 2—2 of FIG. 3.
Figure 3:
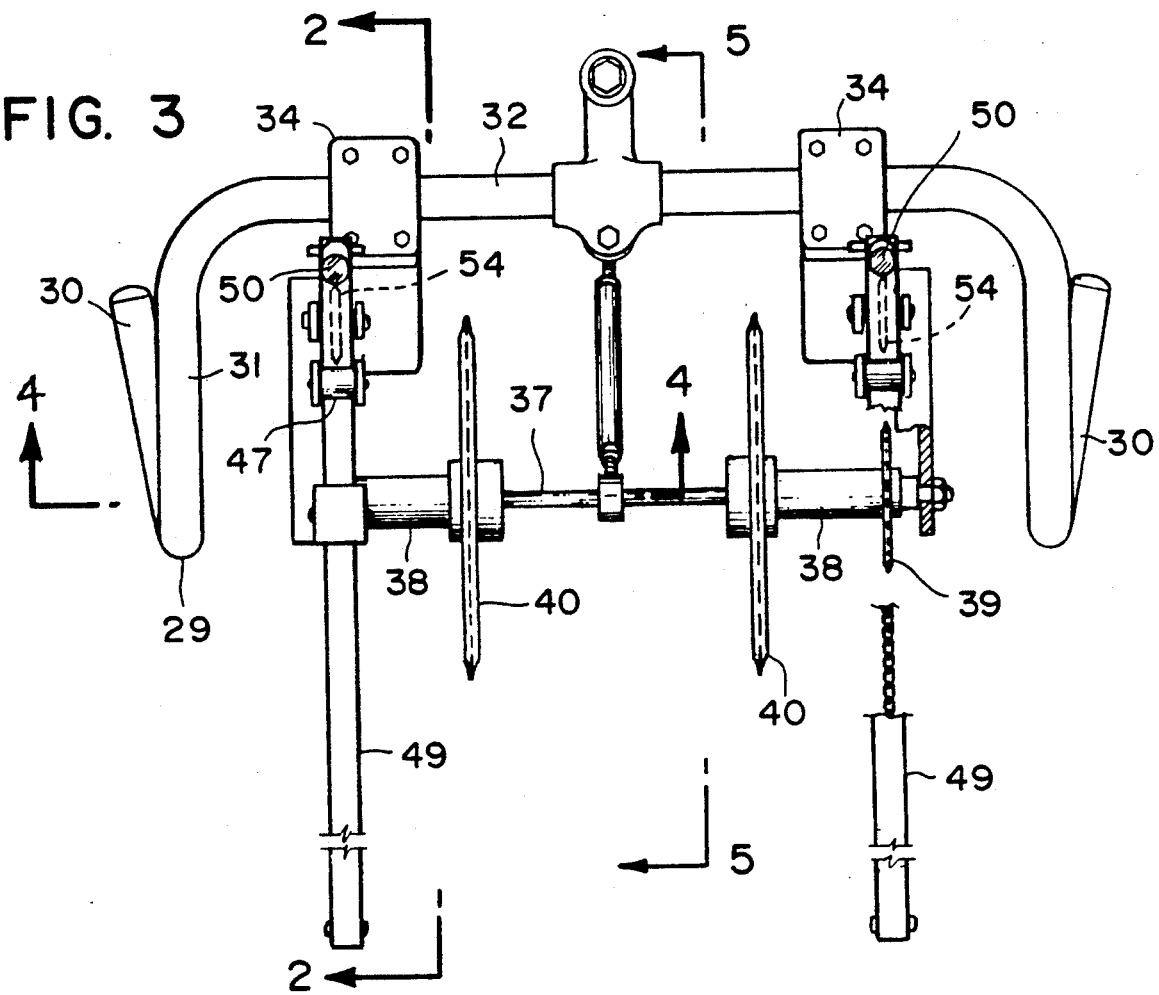
FIG. 3 is a fragmentary elevational view illustrating certain constructional details of the present invention.

Guide members 44 and 45 are provided as shown in FIG. 2, and bearings or rollers 46, 47 and 48 are rotably mounted in the guide members 44 and 45.

Numeral 49 indicates push pull levers which each have handgrips 50 secured to the upper ends thereof. A chain 51 is arranged within each lever 49, and the ends of the chain 51 are secured in place to the lever 49 at the points 52 and 53. The chain 51 engages the cog 39 and the cog 39 is in the form of a ratchet. There is also provided a stabilizer cog or idler cog 54 which is rotably supported as at 55, and the cog 54 helps maintain the parts in their proper aligned position.

The parts can be made of any suitable material and in different shapes and sizes as desired or required.

From the foregoing it will be seen that there has been provided a bicycle auxiliary power unit wherein hand powered levers 49 provide a new unique and efficient mechanical method of transposing the natural power strokes of the rider to the mechanism propelling the vehicle. In use, all parts of the right side of the front wheel 21 work independently of all parts of the left side of the front wheel 21. The present invention is adapted to be utilized after the bicycle has been pedal propelled to a given speed. The rider grasps the handgrips 50 of the push pull levers 49, and as he pedals, he pushes the power lever 49 down in a forward motion. The power lever 49 is a channel with a straight piece of bicycle chain 51 therein that has its ends secured in place as at 52 and 53 to the lever 49. The straight piece of bicycle chain 51 is secured inside the lever 49, and chain 51 rides on a free wheel cog 54. This forward motion of lever 49 engages the ratchet in the cog 39 forcing it to rotate forward. Simultaneously, the upper cog 40 also turns forward because these cogs 39 and 40 are joined on the same sleeve or supported segment 38 of this unit. This forward power motion of the cog 40 is conveyed to the lower cog 42 by the bicycle chain 41 which causes the front wheel 21 to turn, to increase the speed of the bicycle. At this point, power lever 49 is positioned all the way forward.

In the second stage, the rider pulls the power lever 49 back up by means of handgrip 50 to start the push position. The only mechanical action is the bearings guiding the power lever, reverse, and free wheel cog ratchet 39 disengages letting it roll free. The cycle is ready to repeat. In use, action of the left side is opposite of the right side and vice versa. Thus, when the left side pushes, the right side pulls and then reverse actions push pull, push pull. Thus, there is provided a street bicycle that exercises the upper and lower extremities.

Figure 5:
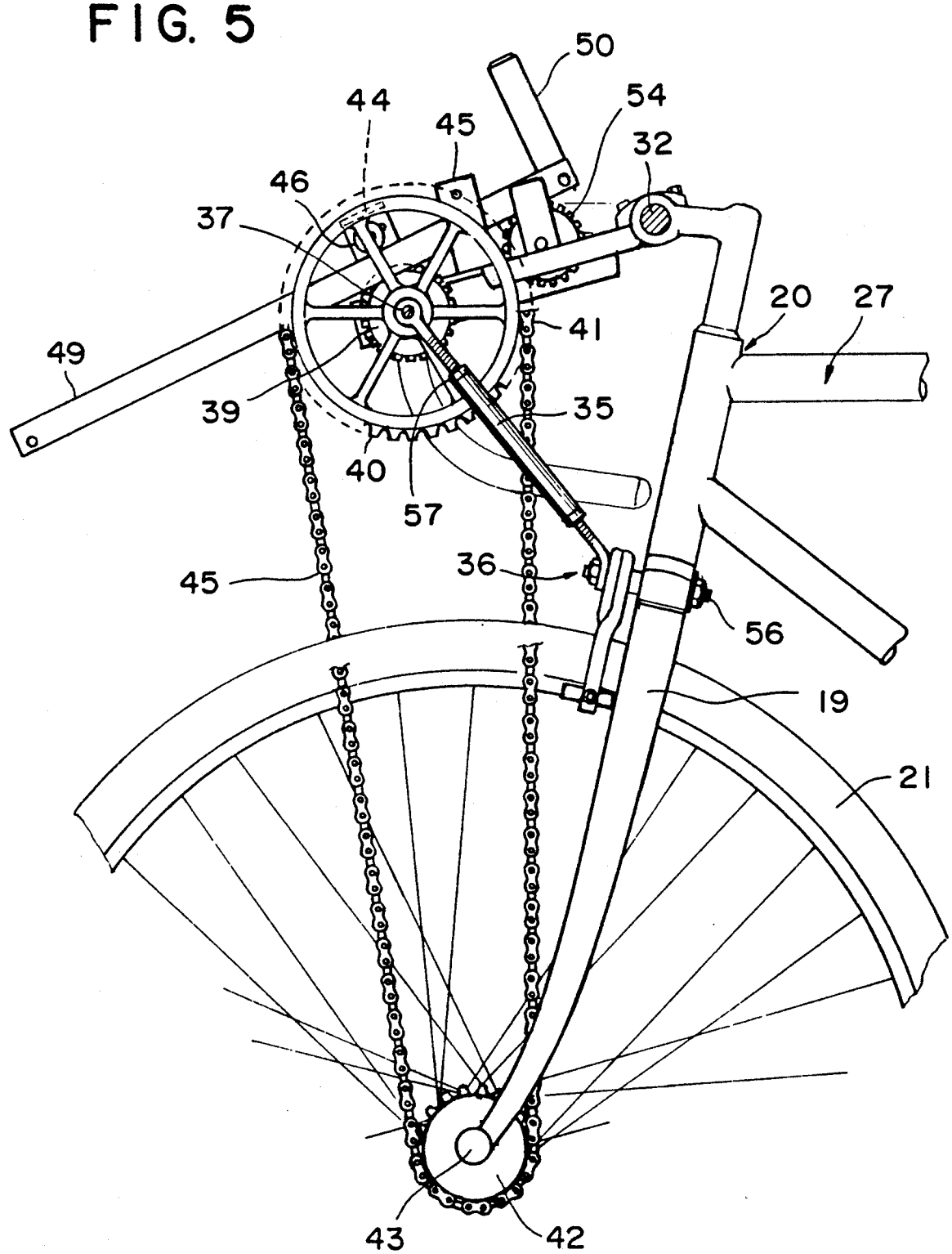
FIG. 5 is a fragmentary sectional view taken on the line 5—5 of FIG. 3.

As shown in FIG. 5, there is provided threaded adjustable support rods or brace assemblies which may have a lock nut washer on the lower end thereof, and a threaded rod 56 engages the fork 19 so that both sides can use the hole which supports the brake assembly. A lock nut 56 can be provided on the assembly 35, and a nut with horizontal threads screws on the center shaft, and a vertical thread is provided to accommodate the support rod. Support elements 35 also provide a support for the axle or shaft 37.

In FIG. 2 the numeral 54 indicates an idler guide sprocket which is mounted on a shaft bearing 55, and a groove is adapted to be cut in the support frame 33. The numeral 54 in FIG. 2 indicates an idler guide sprocket. An end stud 52 secures the chain 51 in the channel 49 and also acts as a stopper for the power drive channels and they cannot pass the idler guide sprocket support.

While the present invention has been specifically described and illustrated as a bicycle auxiliary power unit it is to be understood that the present invention can be used in different applications as, for example, in a child's small boat or car, wherein the power levers would have foot pedals and be foot activated. Also, the principles of the present invention are applicable for other purposes such as for use by paraplegics.

The present invention is adaptable to be used for increasing the effective speed of a conventional bicycle, by transmitting all the available physical power to the vehicle's forward motion.

It will therefore be understood that while we have shown and described the invention in a preferred form, changes may be made in the structure shown, without departing from the scope of the invention, as sought to be defined in the following claims.

We claim:

1. An auxiliary power unit for a bicycle that includes a frame, front wheel and rear wheel and handlebars, foot pedal means for driving the rear wheel, said auxiliary power unit comprising support members connected to said handlebars, brackets secured to said support members, said auxiliary power unit further including a horizontally disposed axle, brace assemblies providing a support for said last named axle, a sleeve mounted on said last named axle, drive and driven cogs secured to said sleeve, the front wheel of the bicycle including an axle having a cog thereon, endless chains connecting said driven cog to the cogs on the front wheel axle, push pull levers having handgrips secured to the upper ends thereof, a straight chain section arranged within each lever and having its ends secured to said lever, said straight chain section being arranged in engagement with said drive cog, and said drive cog functioning as a ratchet.

* * * * *